United States Patent
Narayanan et al.

(10) Patent No.: US 11,784,512 B2
(45) Date of Patent: Oct. 10, 2023

(54) ENHANCED COMMUNICATIONS FOR WIRELESS POWER TRANSFER

(71) Applicant: Apple Inc., Cupertino, CA (US)

(72) Inventors: Sriram Narayanan, Los Gatos, CA (US); Xing Zhou, San Jose, CA (US); Alireza Safaee, Cupertino, CA (US); Zaid A AbuKhalaf, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/814,099

(22) Filed: Jul. 21, 2022

(65) Prior Publication Data

US 2023/0037635 A1 Feb. 9, 2023

Related U.S. Application Data (60) Provisional application No. 63/230,190, filed on Aug. 6, 2021.

(51) Int. Cl.
| | |
|---|---|
| H02J 50/10 | (2016.01) |
| H04L 27/14 | (2006.01) |
| H04L 27/04 | (2006.01) |
| H02J 50/80 | (2016.01) |

(52) U.S. Cl.
CPC .............. *H02J 50/10* (2016.02); *H02J 50/80* (2016.02); *H04L 27/04* (2013.01); *H04L 27/14* (2013.01)

(58) Field of Classification Search
CPC ...................................................... H04L 27/04
See application file for complete search history.

(56) References Cited

U.S. PATENT DOCUMENTS

| | | | |
|---|---|---|---|
| 2002/0141347 A1 | 10/2002 | Harp et al. | |
| 2015/0280455 A1* | 10/2015 | Bosshard | B60L 53/122 |
| | | | 307/104 |
| 2021/0242907 A1* | 8/2021 | Sherman | H04B 5/0037 |

FOREIGN PATENT DOCUMENTS

EP 2131490 B1 8/2017

OTHER PUBLICATIONS

International Search Report & Written Opinion for PCT Application No. PCT/US2022/038871 dated Dec. 2, 2022; 11 pgs.

* cited by examiner

*Primary Examiner* — Daniel Kessie
(74) *Attorney, Agent, or Firm* — FLETCHER YODER PC (57) ABSTRACT

A wireless power transmitter can receive the results of a characterizing signal transmitted by the wireless power receiver, compute at least two parameters of a model characterizing an in-band communications channel based on the received results of the characterizing signal transmitted by the wireless power receiver, compute a plurality of equalizing filter taps from the at least two parameters, and apply the computed equalizing filter to subsequent signals received by the wireless power transmitter via the in-band communications channel. A first parameter can correspond to a time constant of the channel, and a second parameter can correspond to a damping value of the communications channel. The wireless power transmitter can transmit to a wireless power receiver a request to transmit a characterizing signal through the in-band communication channel, wherein the characterizing signal transmitted by the wireless power receiver is sent in response to the transmitted request.

20 Claims, 9 Drawing Sheets

ENHANCED COMMUNICATIONS FOR WIRELESS POWER TRANSFER

CROSS-REFERENCE TO RELATED APPLICATIONS

This application claims priority to U.S. Provisional Application No. 63/230,190, filed Aug. 6, 2021, entitled, "ENHANCED COMMUNICATIONS FOR WIRELESS POWER TRANSFER," which is hereby incorporated by reference in its entirety for all purposes.

BACKGROUND

Wireless power transfer (WPT) systems, including inductive power transfer (IPT) systems, may rely on "in-band" communications, in which the transferred power is used to establish a communications channel between a power transmitting device, i.e., power transmitter (PTx), and a power receiving device, i.e., power receiver (PRx). Various arrangements possible, including various embodiments in which the power transmitter (PTx) can modulate certain electrical characteristics of the power delivered, such as voltage, frequency, etc., to convey encoded information to the power receiver (PRx), which is able to detect the changes in electrical characteristics (i.e., modulation) imposed by the PTx. Likewise, the power receiver (PRx) can modulate certain electrical characteristics of the power received, such as voltage, frequency, etc., to convey encoded information to the power transmitter (PTx), which is likewise able to detect the changes in electrical characteristics (i.e., modulation) imposed by the PRx. In some applications, the physical construction and configuration of the devices, as well as the electrical operating conditions may impose bandwidth limitations on the communications channel that are below a desired communications bandwidth.

SUMMARY

Thus, it would be advantageous to provide wireless power transfer devices and techniques that are able to adapt to various physical configurations and electrical operating conditions to enhance the available bandwidth of the communications channel.

A method performed by one or more processing elements of a wireless power transmitter can include receiving the results of a characterizing signal transmitted by the wireless power receiver, computing at least two parameters of a model characterizing an in-band communications channel based on the received results of the characterizing signal transmitted by the wireless power receiver, computing a plurality of equalizing filter taps from the at least two parameters, and applying the computed equalizing filter to subsequent signals received by the wireless power transmitter via the in-band communications channel. A first parameter can correspond to a time constant of the channel, and a second parameter can correspond to a damping value of the communications channel. Computing the second parameter can include determining whether the wireless power transfer system is underdamped. Determining whether the wireless power transfer system is underdamped can include computing an overshoot resulting from the characterizing signal transmitted by the wireless power receiver. The second parameter can be set to 1 if the wireless power transfer system is not underdamped. The characterizing signal can be a step signal. The method can further include transmitting to a wireless power receiver a request to transmit a characterizing signal through the in-band communication channel, wherein the characterizing signal transmitted by the wireless power receiver is sent in response to the transmitted request.

A wireless power transmitter can include an inverter that receives a DC input voltage and produces an AC output voltage, a wireless power transmitter coil that receives the AC output voltage from the inverter and delivers power to a wireless power receiver by magnetic coupling, controller and communications circuitry that controls the inverter and provides in-band communications with the wireless power receiver via the wireless power transmitter coil. The controller and communications circuitry can be configured to receive the results of a characterizing signal transmitted by the wireless power receiver, compute at least two parameters of a model characterizing an in-band communications channel based on the received results of the characterizing signal transmitted by the wireless power receiver, compute a plurality of equalizing filter taps from the at least two parameters, and apply the computed equalizing filter taps to subsequent signals received by the wireless power transmitter via the in-band communications channel. A first parameter can correspond to a time constant of the channel, and a second parameter can correspond to a damping value of the communications channel. The controller and communication circuitry can be further configured to compute the second parameter in part by determining whether the wireless power transfer system is underdamped. The controller and communication circuitry can be further configured to determine whether the wireless power transfer system is underdamped by computing an overshoot resulting from the characterizing signal transmitted by the wireless power receiver. The controller and communication circuitry can be further configured to set the second parameter to 1 if the wireless power transfer system is not underdamped. The characterizing signal can be a step signal. The controller and communication circuitry can be further configured to transmit to the wireless power receiver a request to transmit a characterizing signal through the in-band communication channel, and wherein the characterizing signal transmitted by the wireless power receiver is sent in response to the transmitted request.

A wireless power receiver can include a wireless power receiver coil that receives power from a wireless power transmitter by magnetic coupling, a rectifier that receives an AC voltage from the wireless power receiver coil and produces a DC output voltage to power a load, controller and communications circuitry that controls the rectifier and provides in-band communications with the wireless power transmitter via the wireless power receiver coil, wherein the controller and communications circuitry can be configured to transmit a characterizing signal to the wireless power transmitter. The controller and communications circuitry can provide in-band communications with the wireless power transmitter via load modulation. The load modulation can result in amplitude shift keying of the received power. The control and communications circuitry can be configured to transmit the characterizing signal to the wireless power transmitter responsive to a request received from the wireless power transmitter. The request received from the wireless power transmitter can be a frequency shift keyed signal. The characterizing signal can be a step signal.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 1:
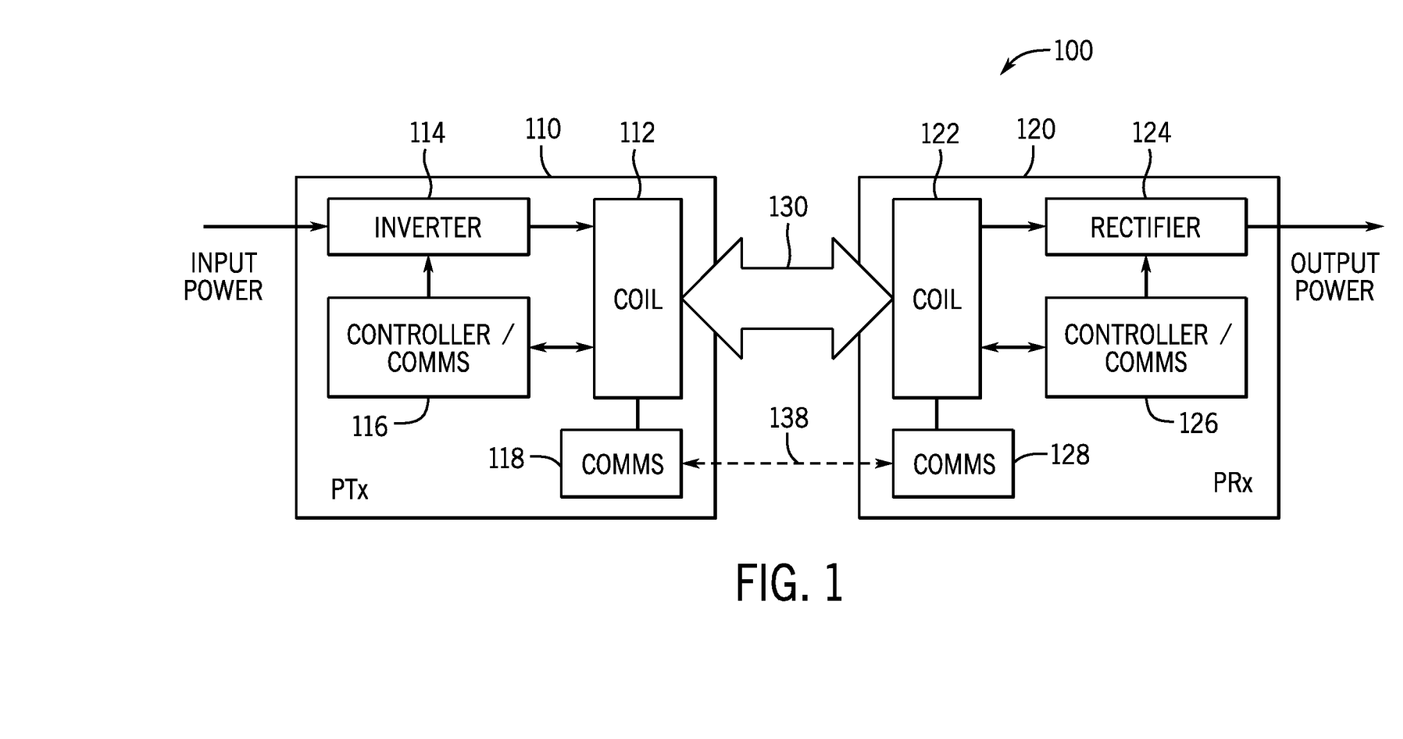
FIG. 1 illustrates a block diagram of a wireless power transfer system.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
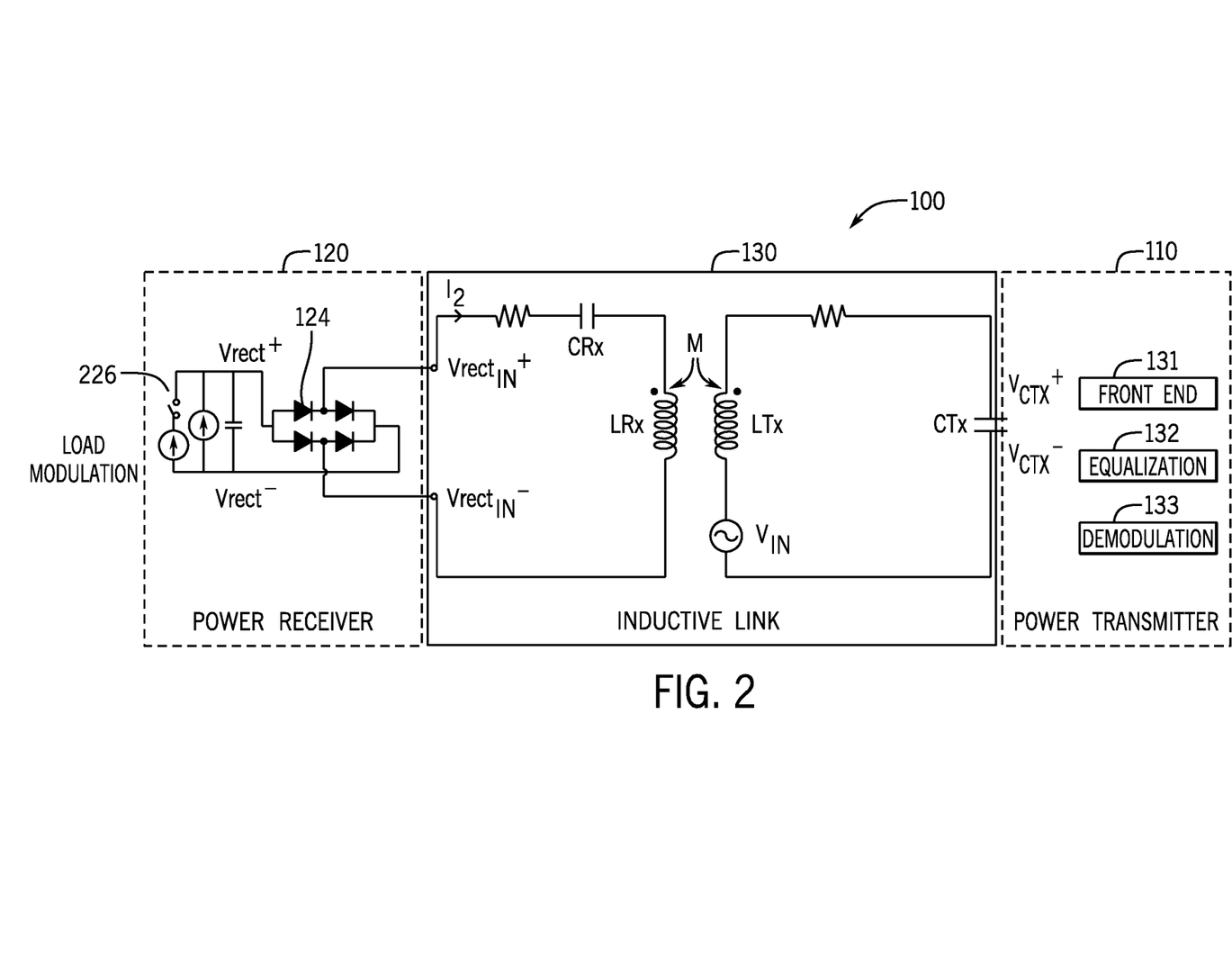
FIG. 2 illustrates a simplified schematic of a wireless power transfer system.

FIG. 2 illustrates a simplified schematic of an inductive wireless power transfer system 100. Wireless power transfer system 100 includes a power receiver 120, an inductive link 130, and a wireless power transmitter 110 as described above. Inductive link 130 is not a separate device, but rather includes components that are part of wireless power receiver 120 (e.g., power receiver winding LRx and tuning capacitor CRx) or part of wireless power transmitter 110 (e.g., power transmitter winding LTx and tuning capacitor CTx). The respective power transmitter and receiver windings may be magnetically coupled, for example by being brought into physical proximity, allowing for power delivery and providing a communications channel between power transmitter 110 and power receiver 120. In some embodiments, power transfer may be unidirectional from transmitter to receiver, although it is also possible to allow for bidirectional power transfer, in which power may flow from "receiver" to "transmitter" if appropriate in a particular context. In either case, communications may be bidirectional between wireless power transmitter 110 and wireless power receiver 120.

In one embodiment, wireless power transmitter 110 may modulate one or more electrical characteristics of the delivered power (e.g., frequency) to communicate encoded information to wireless power receiver 120 using frequency shift keying (FSK) or other communications techniques. These frequency (or other parameter) changes may be reflected across inductive link 130, and power receiver 120 may include circuitry to detect and decode these frequency (or other electrical parameter) changes. Similarly, wireless power receiver 120 may modulate the load applied (and thus power drawn) from the inductive link to communicate encoded information to the power transmitter 110. In the illustrated simplified schematic, load modulation may be provided by circuitry represented by switched current source 226. By switching an additional load in parallel with the regular load of the receiver device on the DC side of rectifier 124, power drawn from the inductive power link may be increased or decreased. As a result, current amplitude changes may be reflected across inductive link 130 and can be detected and decoded by circuitry in wireless power transmitter 110 (e.g., by demodulation block 133).

The physical construction of wireless power transmitter 110 and wireless power receiver 120, their configuration (e.g., relative positioning, alignment, and separation), and the electrical operating conditions (e.g., amount of power being transferred, electrical noise or interference, etc.) can all affect the bandwidth of the communications channel described above. In some cases, the frequency response from wireless power receiver 120 to wireless power transmitter 110 may cause symbols transmitted in time to spread to other symbols, thereby causing inter-symbol interference (ISI) and degrading the quality of communications. These limitations can result from a variety of physical limitations, but in general the communications channel may be thought of as a filter with a frequency response that may distort transmitted symbols. However, in some applications the power transmitter may derive and apply a filter that is an inverse of this channel frequency response to allow for higher communications bandwidth. However, in some applications the transmitter may derive and apply a filter that is an inverse of this slow frequency response to allow for higher communications bandwidth. This technique is a form of equalization.

The equalization may be achieved by causing or inviting the PRx device to send a predetermined characterizing signal that may be received and analyzed by the PTx device. The characterizing signal may be initially received by a signal front end 131 that can apply various conditioning and analysis to the received signal. The PTx may employ calculation techniques based on a model of the communications channel that can characterize the channel in terms of two parameters: $\tau$ (corresponding to a time constant of the channel) and $\zeta$ (corresponding to a damping factor of the channel). These parameters relate to the physical and electrical characteristics of a given channel. Once $\tau$ and $\zeta$ are determined, they may be used to determine the filter taps of a filter that the PTx device can apply to the received signal to overcome the bandwidth limitations of the channel, allowing for higher data rate communications. These filter taps define a filter that may be applied to the communication channel by equalization block 132 of the PTx device. This technique will now be described in greater detail with respect to FIGS. 3-5.

Figure 3:
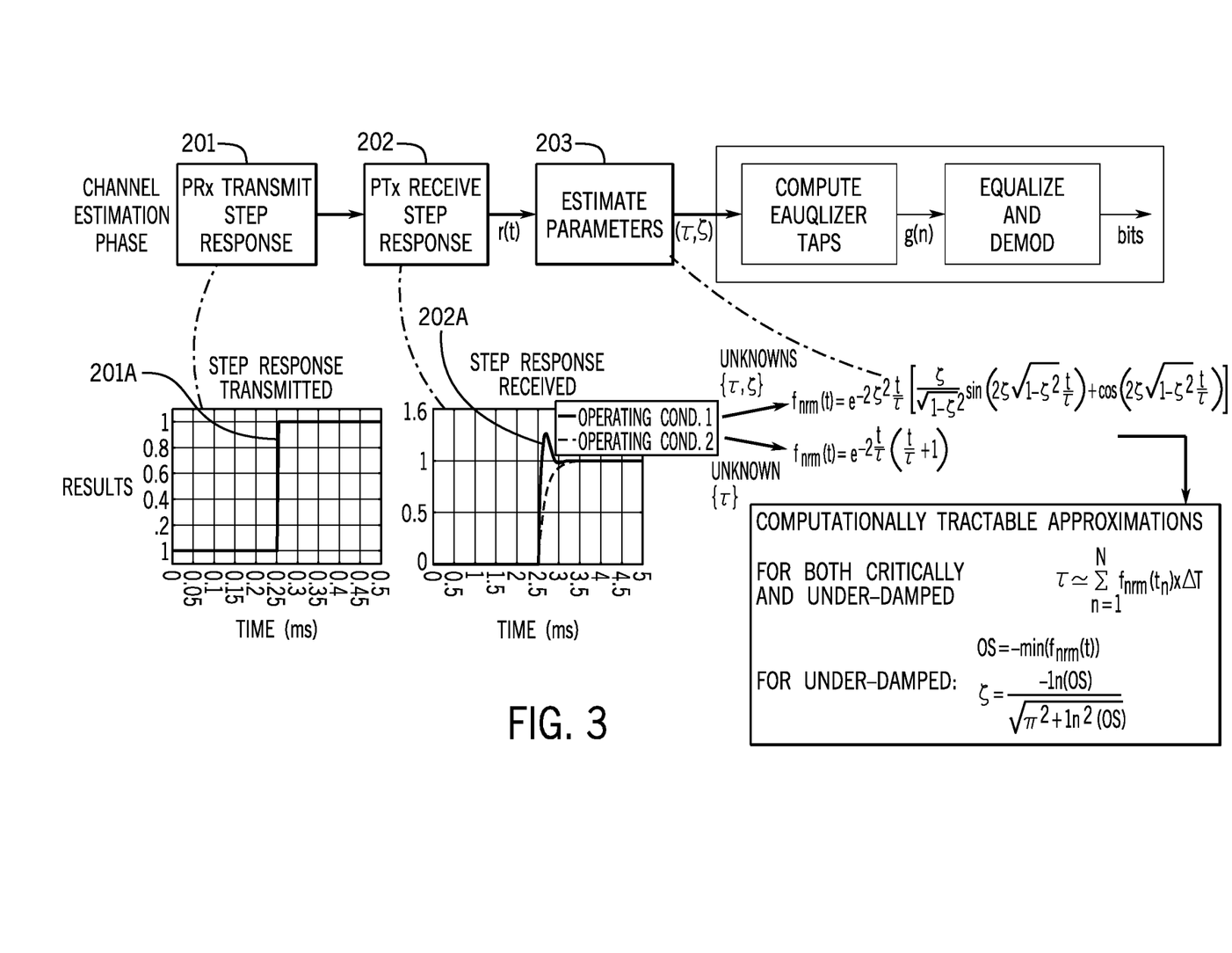
FIG. 3 illustrates a flowchart of a first portion of an inductive power transfer communications channel equalization technique including exemplary characterization waveforms.

FIG. 3 illustrates a high-level flow diagram depicting a first portion of the channel estimation technique introduced above. Beginning at block 201, the PRx device 120 can transmit a step response signal 201a. This step signal 201a can be used by the transmitter to characterize the channel. As an alternative to a step signal, other signals having known, agreed, and/or predetermined characteristics could be used in lieu of a step function, such as an impulse function (i.e., $\delta(t)$), a predefined chirp signal, etc. This characterizing signal can be transmitted in response to a communication from the PTx device 110 inviting such a signal or otherwise indicating that it is ready to receive such a signal. In such cases, the PTx device or PRx device may initiate a high-speed communication initiation process that includes the channel estimation technique. Various messaging and communication techniques that may be used to establish a high-speed communication channel are described in greater detail below. In some cases, the PRx device may be configured to transmit the characterizing signal as part of its own startup and negotiation process.

In block 202, a signal r(t)/202a corresponding to the step response or other characterizing signal may be received by PTx device 110. As illustrated, depending on the nature of the channel, the system may be in one of two operating conditions. In operating condition 1, the system is "underdamped," and the received step response 202a has an overshoot. In operating condition 2, the system is "critically damped" or "overdamped," and the received step response 202a has no overshoot. In operating condition 1, i.e., the underdamped case, the parameters $\tau$ and $\zeta$ may be computed (e.g., by the PTx device) from the normalized function $f_{nrm}$ using the illustrated equations, described in greater detail below with reference to FIG. 5. In operating condition 2—the critically damped or overdamped condition—$\tau$ may be computed using the same formula as in operating condition 1 and $\zeta$ may be assumed to be 1, which corresponds to critical damping, but is sufficiently accurate even in an overdamped case. As described with reference to the description of FIG. 5, below, the approximated formulas for $\tau$ and $\zeta$ are sufficiently computationally tractable that they may be implemented using one or more processing elements, such as digital signal processor or microcontroller integrated circuits, that can be part of PTx controller/comms circuitry 116, thus rendering them particularly suitable for various consumer electronics applications. In some applications the one or more processing elements could also or alternatively include FPGAs, ASICs, or other types of processors or suitably configured circuitry.

Figure 4:
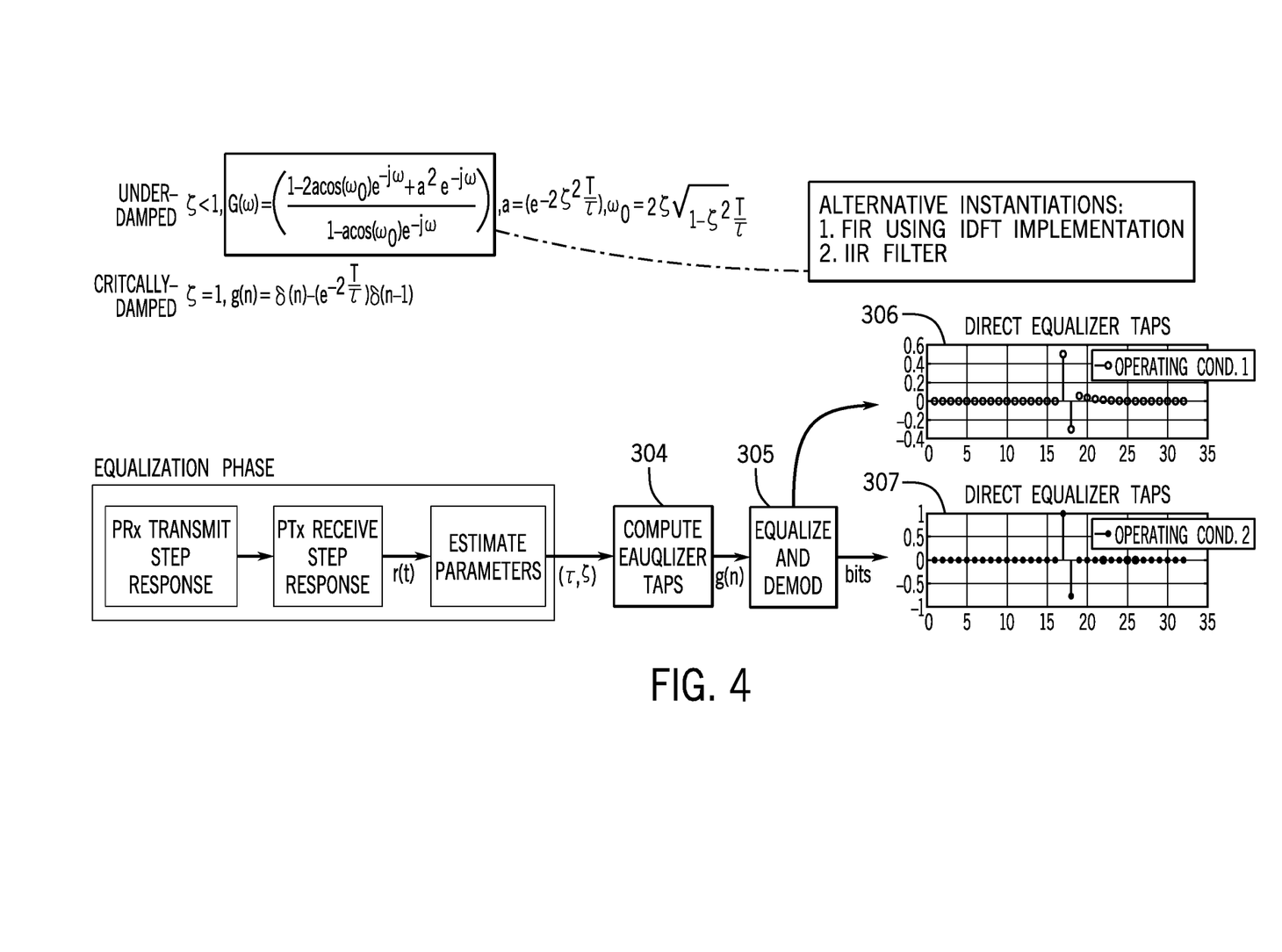
FIG. 4 illustrates a flowchart of a second portion of an inductive power transfer communications equalization technique including exemplary resulting equalization filters.

Turning now to FIG. 4, the equalization technique continues with block 304, in which the PTx device can take the estimated $\tau$ and $\zeta$ parameters and compute the equalizer taps, i.e., the taps of a discrete time filter g(n). More specifically, in operating condition 1—the underdamped case—the frequency domain representation G($\omega$) of the equalizer may be computed from $\tau$ and $\zeta$ using the formula given in FIG. 4 and discussed in greater detail below with reference to FIG. 5. The time domain filter taps g(n) may then be determined by applying an inverse discrete Fourier transform (or other suitable transform) to this frequency domain representation. Alternatively, a suitable infinite impulse response (IIR) filter may be computed and applied. In operating condition 2—the critically damped or overdamped condition—$\zeta$ may be assigned a value of 1, and the time domain filter taps g(n) may be computed using the formula given in FIG. 4 and discussed below with reference to FIG. 5. In either case, the resulting equalization filter g(n) may be applied to subsequent signals received by the PTx device from the PRx device to compensate for the filtering effects of the communications channel.

Block 306 illustrates an exemplary equalizer tap sequence 306 for an operating condition 1 (underdamped) configuration. As can be seen, there is a large positive tap value, followed by a smaller, but still relatively large negative tap, followed by a few non-zero, relatively smaller tap values. Block 307 illustrates an exemplary equalizer tap sequence 307 for an operation condition 2 (critically damped or overdamped) configuration. As can be seen, there is a large positive tap value, followed by a smaller, but still relatively large negative tap, followed by zero tap values. These respective filter tap configurations can be found in all underdamped or critically/over-damped systems—with differing numeric values depending on the exact physical characteristics and configurations as well as electrical operating conditions.

Figure 5:
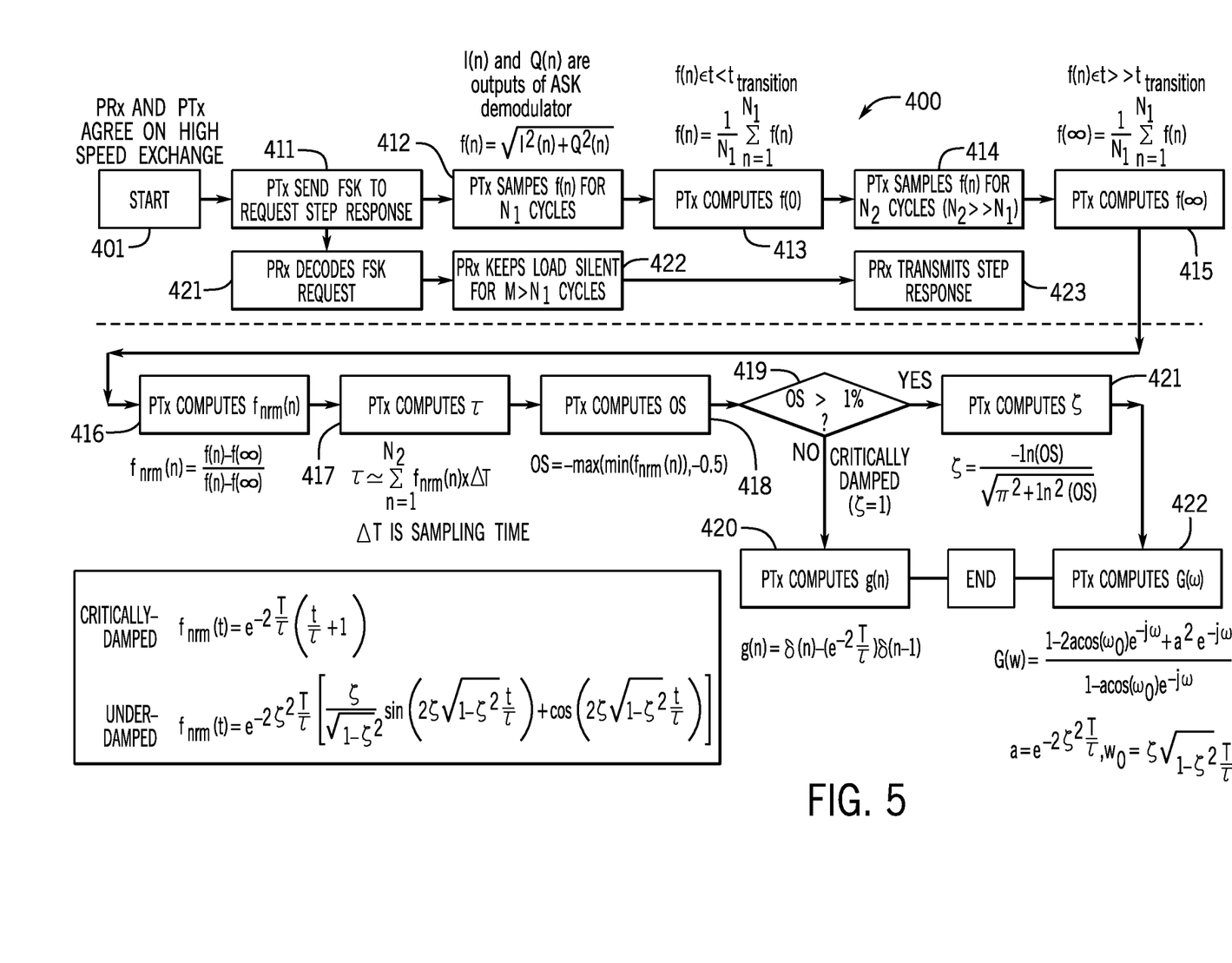
FIG. 5 illustrates a more detailed flowchart of an inductive power transfer communications channel equalization technique.

FIG. 5 illustrates an expanded block diagram/flowchart depicting in greater detail the technique described above with respect to FIGS. 3 and 4. Beginning at block 401, PRx 120 and PTx 110 can agree to negotiate a high-speed communications link. Prior to this point, all communications between PRx 120 and PTx 110 may be conducted in accordance with a predefined protocol, which may be an industry standard protocol, such as the Qi protocol promulgated by the Wireless Power Consortium (WPC). In block 411, after the PRx and PTx agree to negotiate a high-speed communications exchange, PTx 110 may send to PRx 120 a request for PRx 120 to transmit a step response (or other signal that will be used to characterize the communications channel). In some embodiments, this request may be sent using a frequency shift keying (FSK) technique, in which PTx 110 modulates the frequency of the transmitted power in a way that can be detected and decoded by suitable circuitry in PRx 120. Other modulation schemes could also be used as appropriate in a given application. In block 421, PRx 120 may receive and decode the request. In response thereto, in block 422 PRx 120 may quiet the channel for a predetermined time period corresponding to a number of switching cycles of the converter driving the transmit coil, i.e., the switching frequency of the system. In some embodiments, this switching frequency may be in the hundreds of kilohertz, e.g., 100-120 kHz, 128 kHz, 326 kHz, or 360 kHz. In some embodiments, this switching frequency may be in the megahertz range, e.g., 1-2 MHz. In other embodiments, any suitable switching frequency may be used, such as in the gigahertz range. The number of cycles for which the channel is quieted may be M, where M is greater than a value $N_1$. The number of cycles M may be on the order of tens of cycles (e.g., 20 cycles), which can correspond to a time period of tens of microseconds (or greater).

During the interval corresponding to $N_1$ (greater than M), as indicated in block 412, PTx 110 may sample the channel deriving a signal f(n), which can be represented by an I-Q decomposition as:

$$f(n) = \sqrt{I^2(n) + Q^2(n)}$$

The PTx may be further configured (block 413) to compute a value f(0) according to:

$$f(0) = \frac{1}{N_1} \sum_{n=1}^{N_1} f(n)$$

where $N_1$ is the total number of samples on the PTx side at the beginning of the quieted period, and the function values are the respective samples. The value f(0) can correspond to an average initial condition and can be used for normalization as described in greater detail below.

After the expiration of the M cycles, in block 423, PRx 120 may transmit the step response (or other characterizing signal). Concurrently (block 414), PTx 110 may sample f(n), i.e., the received step response (or other characterizing signal) for a number of cycles $N_2$ that is much larger than $N_1$. For example, $N_2$ may be on the order of hundreds of cycles (e.g., 200 cycles) corresponding to a time period of hundreds of microseconds (or greater). In the illustrated example $N_2$ is an order of magnitude greater than $N_1$, although other values may be used, provided that $N_2$ is sufficiently larger than $N_1$. Then (block 415), PTx 110 may compute f(∞) according to the formula where $N_1$ is the total number of samples on the PTx side at the end of the quieted period:

$$f(\infty) = \frac{1}{N_1} \sum_{n=1}^{N_1} f(n)$$

Then, moving on to block 416, PTx 110 may compute a normalized response $f_{nrm}(n)$ using each measured response value f(n) and the computed f(0) and f(∞) according to the formula:

$$f_{nrm}(n) = \frac{f(n) - f(\infty)}{f(0) - f(\infty)}$$

Once the normalized function is computed, the PTx may compute τ (block 417) according to the formula:

$$\tau \approx \sum_{n=1}^{N_2} f_{nrm}(n) \times \Delta T$$

where ΔT is the sampling time. Additionally, the PTx may compute the overshoot value OS (block 418) according to the formula:

$$OS = -\max(\min(f_{nrm}(n), -0.5))$$

The overshoot value can be the negative value of the greater of 0.5 and the minimum value of $f_{nrm}$. As a result, the overshoot value will end up being between 0 and 0.5.

Moving on to block 419, the PTx can determine whether the overshoot value is greater than 1%. If not, then the system may be considered as critically damped (operating condition 2) and the PTx may compute the filter taps g(n) (block 420) using the formula for the frequency domain representation of the equalizer G(ω):

$$G(\omega) = e^{j\omega} - 2\left(e^{-2\frac{T}{\tau}}\right) + \left(e^{-2\frac{T}{\tau}}\right)^2 e^{-j\omega}$$

G(ω) may be inverse transformed to generate g(n) as described above with reference to FIG. 4.

Alternatively, if the overshoot is greater than 1%, the system may be considered as underdamped (operating condition 2) meaning that is less than 1 and can be computed from the overshoot (block 421) in accordance with the formula:

$$\zeta = \frac{-\ln OS}{\sqrt{\pi^2 + (\ln OS)^2}}$$

Then, in block 422, the frequency domain representation of the equalizer G(ω) may be computed by:

$$G(\omega) = e^{j\omega} - 2a\cos(w_0) + \alpha^2 e^{-j\omega} \text{ where:}$$

$$a = e^{-2\zeta^2 \frac{T}{\tau}}, \omega_0 = 2\zeta\sqrt{1-\zeta^2}\frac{T}{\tau}$$

G(ω) may be inverse transformed to generate g(n) as described above with reference to FIG. 4.

Figure 6:
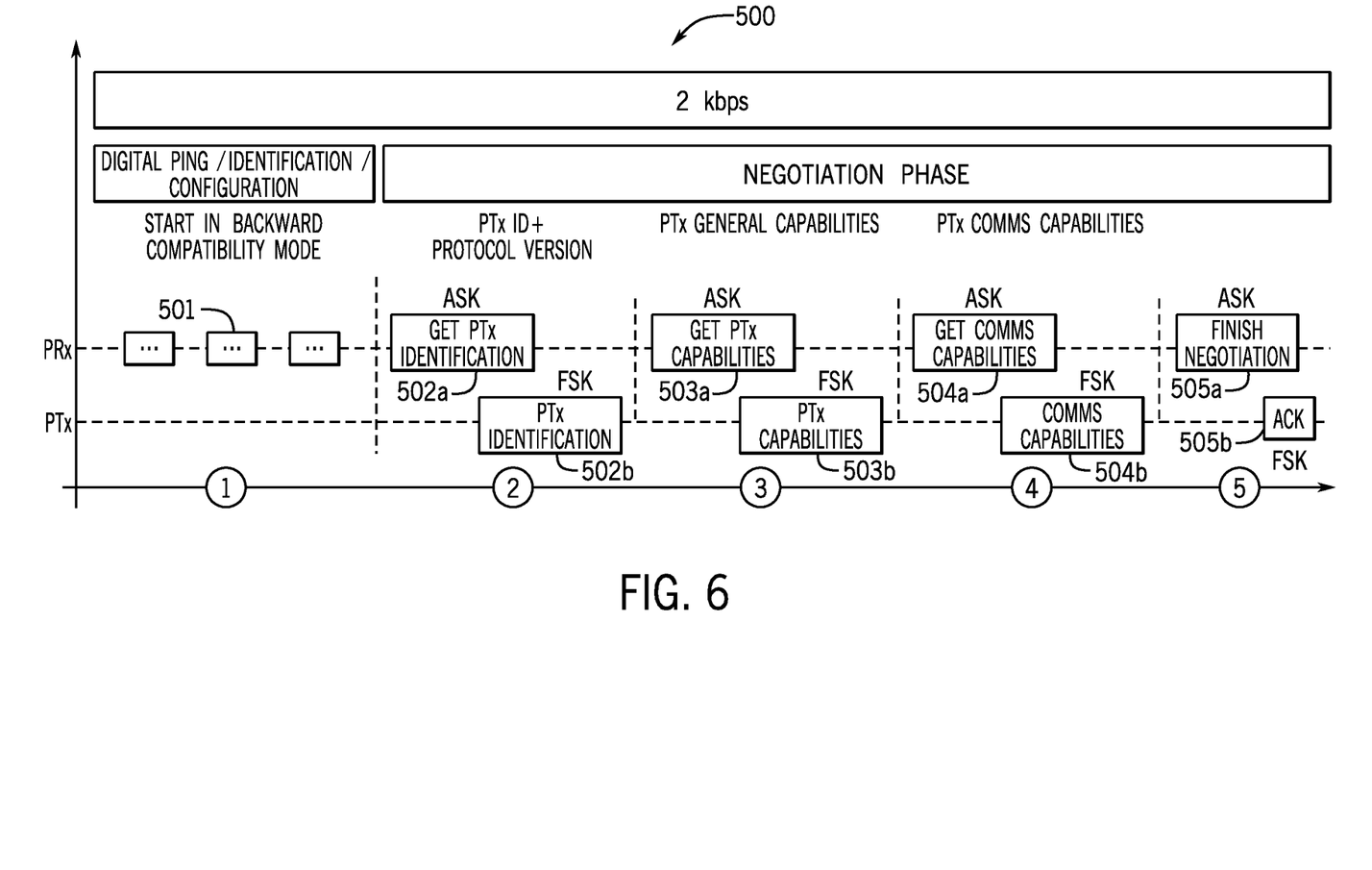
FIG. 6 illustrates messaging associated with a wireless power transfer system.

Turning now to FIG. 6, a communication process 500 that may be used to initiate communication between a wireless power transmitter (PTx) and a wireless power receiver (PRx) is illustrated. The process may commence at a slow data rate (e.g., 2 kbps). Initially, in block 1, the PRx may send a plurality of messages 501 that are a digital ping/identification/communication. Responsive thereto, in block 2, the PRx may send a request for identification message 502*a* to the PTx. These and other messages from the PRx may be sent by amplitude shift keying (ASK) of the received power signal as described above with reference to FIGS. 1-2. In response, the PTx may send an identification message 502*b*. These and other messages from the PTx may be sent by frequency shift keying (FSK) of the received power signal as described above with reference to FIGS. 1-2. Also, for these and all other messages described herein, even if illustrated as single messages, the respective messages may comprise multiple packets, depending on the exact protocol and implementation.

In block 3, the PRx may send a request for the capabilities (e.g., power transfer capabilities, such as maximum power transfer rate, power transfer frequency, etc.) of the PTx device (message 503*a*). In response, the PTx may send a message 503*b* indicating such capabilities. In block 4, the PRx may send a request (message 503*a*) for the communication capabilities of the PTx device (e.g., capability to engage in in-band communications at various frequencies, data rates, etc.). In response, the PTx may send a message 503*b* indicating its communication capabilities. In some applications the two sets of capabilities messages may be combined into a single set. Following the estimation phase, in block 4, the PRx can send a message 514*a* applying a new configuration, e.g., the higher data rate. The PTx can reply with an acknowledgement message 514*b*. Finally, in block 5, the PRx can send a message 505*a* indicating the end of the negotiation phase, which can be acknowledged by a message 505*b* from the PTx device.

Figure 7:
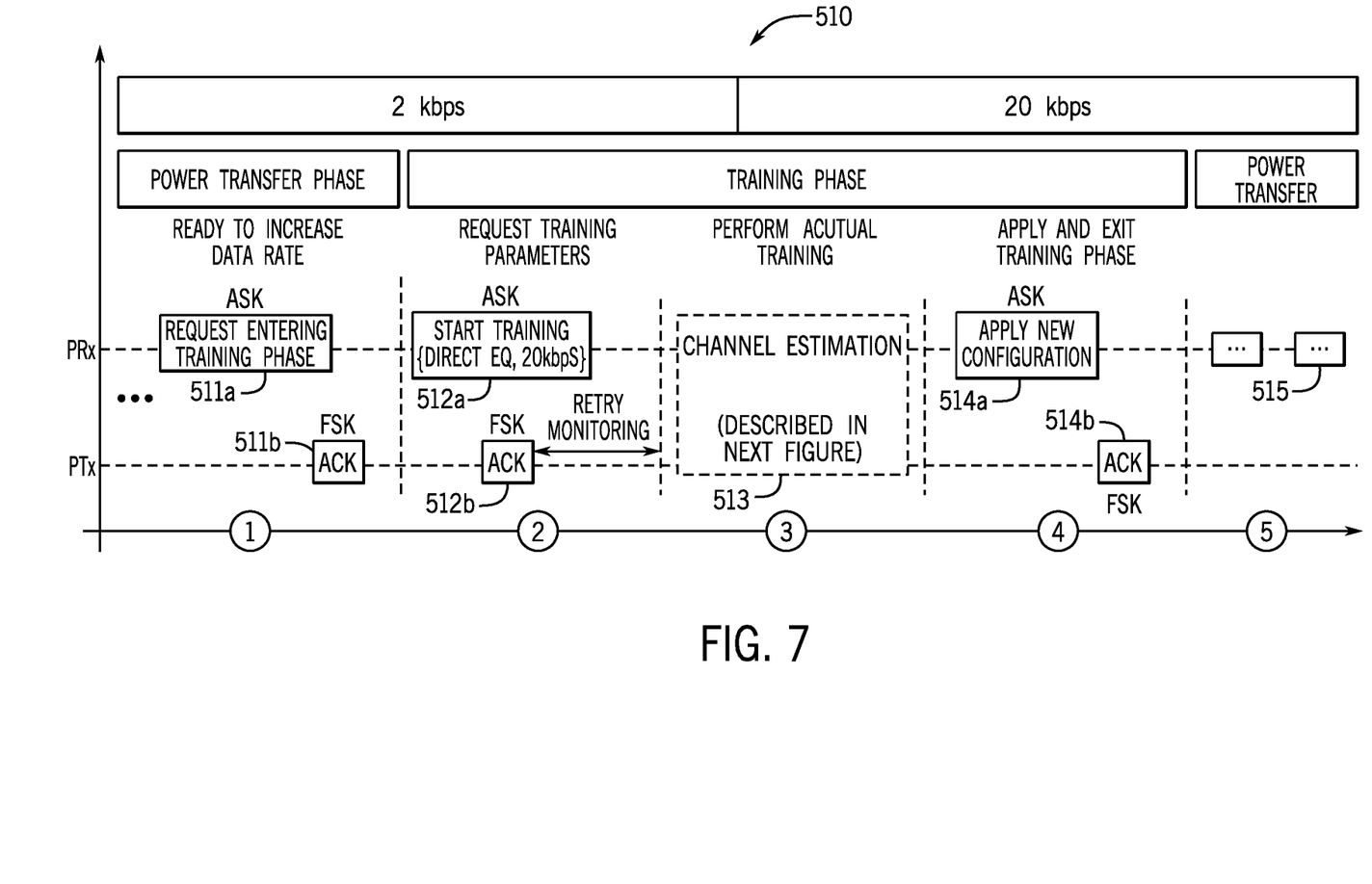
FIG. 7 illustrates messaging associated with training and equalization for high-speed communication in a wireless power transfer system.

Following this exchange, the PRx and PTx may engage in power transfer and subsequently enter a high-speed communication mode as illustrated in FIG. 7. Beginning in block 1, while power transfer can be in process, the PRx can send message 511*a* requesting entry into a training phase in which the communication channel may be characterized as described above with reference to FIGS. 3-5. The PTx may acknowledge this request via ACK message 511*b*. Then, in block 2, the training phase can commence with the PRx sending training parameters, such as the indication for channel equalization and a desired high speed data rate (e.g., 20 kbps), which can be accepted/approved by the PTx. The PTx can send ACK message 512*b*, acknowledging these parameters. Then block 3 can include the channel estimation phase 513, which can be conducted as described above with respect to FIGS. 3-5 and described in further detail below with reference to FIGS. 8-9. This phase can also include the transition from the lower data rate (e.g., 2 kbps) to a higher data rate (e.g., 20 kbps). Following the estimation phase, in block 4, the PRx can send a message 514*a* applying a new configuration, e.g., the higher data rate. The PTx can reply with an acknowledgement message 514*b*. Then, power transfer can resume/continue, with a higher communication rate, as evidenced by messages 515 in block 5.

Figure 8:
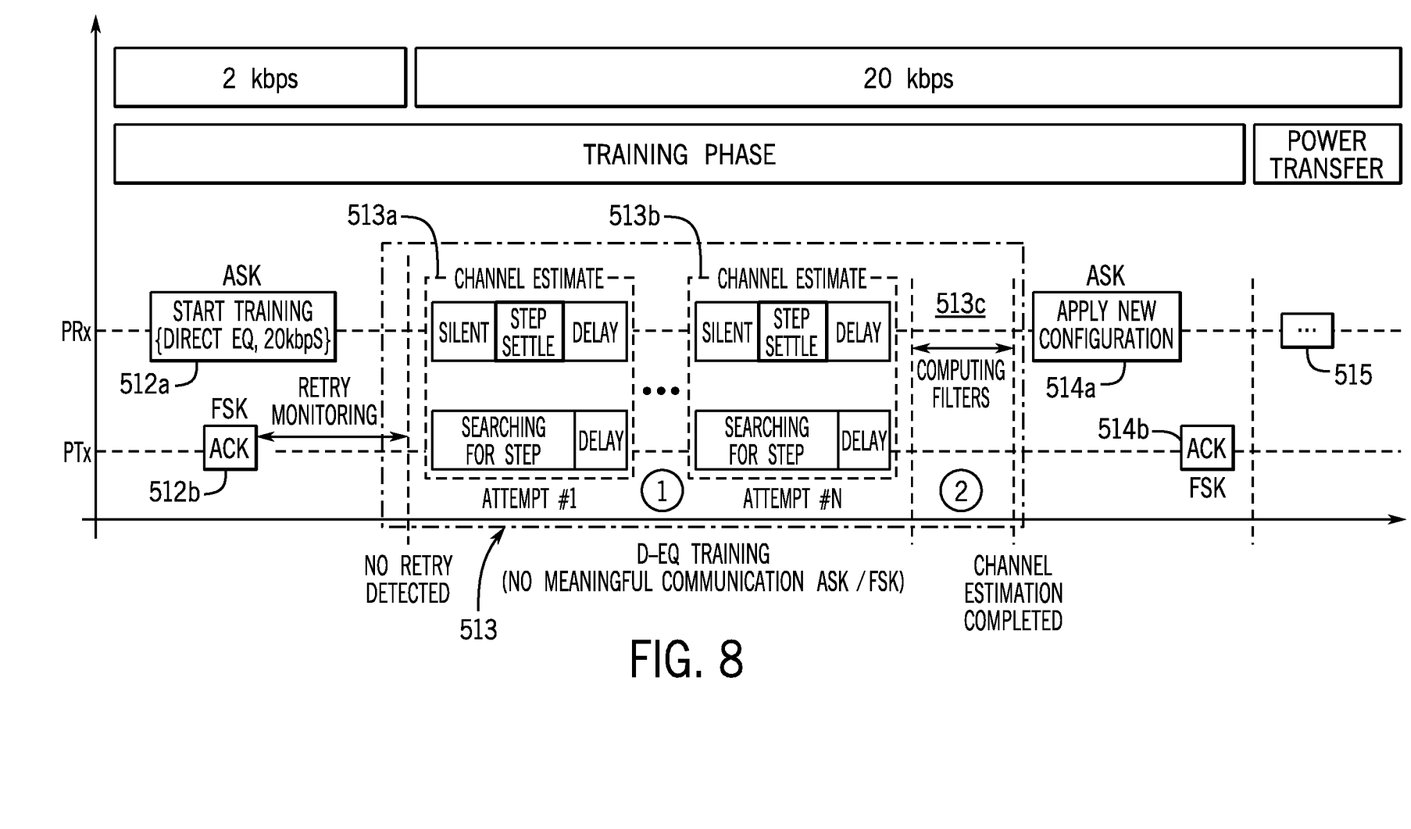
FIG. 8 illustrates a training and equalization technique with associated messaging in a wireless power transfer system with high-speed communications.

FIG. 8 illustrates the channel estimation phase 513 in greater detail. In general, channel estimation proceeds as described above with reference to FIGS. 3-5. As described above with respect to FIG. 8, the training phase may be initiated by the PRx sending a start training message 512*a* to the PTx, which may be acknowledged by the PTx with ACK message 512*b*. This can mark the transition to the high-speed (e.g., 20 kpbs) communications regime and can include one or more channel estimation steps 513*a*, 513*b* during the direct equalization training period. As illustrated, each of these channel estimation blocks can include the PRx device quieting/silencing the channel, transmitting a step (or other characterizing signal), and a delay to allow the PTx to perform its processing. More specifically, PTx can, substantially contemporaneously with the above-described actions of PRx, search for the step signal (or other characterizing signal) and, upon receiving such signal, process the received signal to derive the channel estimation parameters as described in more detail above with respect to FIGS. 3-5. From these channel estimation parameters, a suitable filter for channel equalization can be computed (513*c*) as described above. Then, via messaging 514*a* and 514*b*, the new channel configuration may be applied, and power transfer can resume (515).

Figure 9:
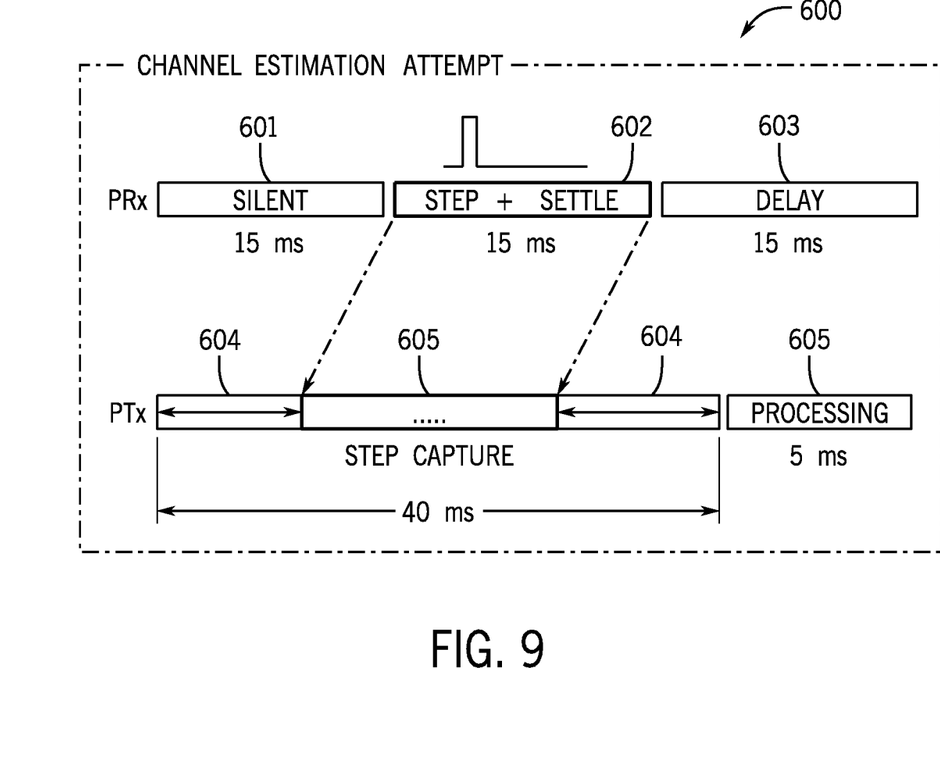
FIG. 9 illustrates a channel estimation and equalization process for high-speed communications in a wireless power transfer system.

FIG. 9 illustrates a simplified timing diagram of the channel estimation attempts 513*a*, 513*b*. The channel estimation process may include one or more of these attempts. This process generally aligns with that described above, and exemplary timing intervals are provided, although other time periods may be appropriate depending on communications frequency, switching frequency of the power converters, etc. Beginning in block 601, the PRx can silence/quiet the comms channel for a certain time period, e.g., 15 ms. Then, in block 602, the PRx can transmit the step signal (or other characterizing signal). This may again take a time period of 15 ms (for example). Following this, in block 603, there may be a delay period, e.g., 15 ms again, before either another channel estimation attempt or the completion of the channel estimation phase.

Substantially contemporaneously with the above-described operations, the PTx may operate in a capture mode for a period, e.g., 40 ms, sufficient to capture the step or other characterizing function (block 605) with a buffer on either side (blocks 604) to account for slight timing differences between the PTx and PRx devices. Subsequently, in block 605, the PTx can perform the required processing to characterize the channel and compute the filter taps, which may be a relatively short time period, e.g., 5 ms. As noted above, all of these time periods are merely exemplary, and other suitable time periods may be employed as appropriate.

Described above are various features and embodiments relating to enhanced communications in wireless power transfer systems. Such arrangements may be used in a variety of applications but may be particularly advantageous when used in conjunction with portable electronic devices employing wireless charging and the corresponding wireless charging devices. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A method performed by one or more processing elements of a wireless power transmitter, the method comprising:
   receiving the results of a characterizing signal transmitted by the wireless power receiver;
   computing at least two parameters of a model characterizing an in-band communications channel based on the received results of the characterizing signal transmitted by the wireless power receiver, wherein a first parameter corresponds to a time constant of the channel, and a second parameter corresponds to a damping value of the communications channel;
   computing a plurality of equalizing filter taps from the at least two parameters; and
   applying the computed equalizing filter to subsequent signals received by the wireless power transmitter via the in-band communications channel.

2. The method of claim 1 wherein computing the second parameter includes determining whether the wireless power transfer system is underdamped.

3. The method of claim 2 wherein determining whether the wireless power transfer system is underdamped comprises computing an overshoot resulting from the characterizing signal transmitted by the wireless power receiver.

4. The method of claim 3 wherein the second parameter is set to 1 if the wireless power transfer system is not underdamped.

5. The method of claim 1 wherein the characterizing signal is a step signal.

6. The method of claim 1 further comprising transmitting to a wireless power receiver a request to transmit a characterizing signal through the in-band communication channel, wherein the characterizing signal transmitted by the wireless power receiver is sent in response to the transmitted request.

7. A wireless power transmitter comprising:
   an inverter that receives a DC input voltage and produces an AC output voltage;
   a wireless power transmitter coil that receives the AC output voltage from the inverter and delivers power to a wireless power receiver by magnetic coupling;
   controller and communications circuitry that controls the inverter and provides in-band communications with the wireless power receiver via the wireless power transmitter coil, wherein the controller and communications circuitry that:
      receives the results of a characterizing signal transmitted by the wireless power receiver;
      computes at least two parameters of a model characterizing an in-band communications channel based on the received results of the characterizing signal transmitted by the wireless power receiver, wherein a first parameter corresponds to a time constant of the channel, and a second parameter corresponds to a damping value of the communications channel;
      computes a plurality of equalizing filter taps from the at least two parameters; and
      applies the computed equalizing filter taps to subsequent signals received by the wireless power transmitter via the in-band communications channel.

8. The wireless power transmitter of claim 7 wherein the controller and communication circuitry computes the second parameter in part by determining whether the wireless power transfer system is underdamped.

9. The wireless power transmitter of claim 8 wherein the controller and communication circuitry determines whether the wireless power transfer system is underdamped by computing an overshoot resulting from the characterizing signal transmitted by the wireless power receiver.

10. The wireless power transmitter of claim 9 wherein the controller and communication circuitry sets the second parameter to 1 if the wireless power transfer system is not underdamped.

11. The wireless power transmitter of claim 7 wherein the characterizing signal is a step signal.

12. The wireless power transmitter of claim 7 wherein the controller and communication circuitry transmit to the wireless power receiver a request to transmit a characterizing signal through the in-band communication channel, and wherein the characterizing signal transmitted by the wireless power receiver is sent in response to the transmitted request.

13. A wireless power receiver comprising:
   a wireless power receiver coil that receives power from a wireless power transmitter by magnetic coupling;
   a rectifier that receives an AC voltage from the wireless power receiver coil and produces a DC output voltage to power a load;
   controller and communications circuitry that controls the rectifier and provides in-band communications with the wireless power transmitter via the wireless power receiver coil, wherein the controller and communications circuitry transmit a characterizing signal to the wireless power transmitter;

wherein the characterizing signal is selected to allow the wireless power transmitter to:

receive the results of a characterizing signal transmitted by the wireless power receiver;

compute at least two parameters of a model characterizing an in-band communications channel based on the received results of the characterizing signal transmitted by the wireless power receiver, wherein a first parameter corresponds to a time constant of the channel, and a second parameter corresponds to a damping value of the communications channel;

compute a plurality of equalizing filter taps from the at least two parameters; and apply the computed equalizing filter to subsequent signals received by the wireless power transmitter via the in-band communications channel.

14. The wireless power receiver of claim 13 wherein the controller and communications circuitry provides in-band communications with the wireless power transmitter via load modulation.

15. The wireless power receiver of claim 14 wherein the load modulation results in amplitude shift keying of the received power.

16. The wireless power receiver of claim 13 wherein the control and communications circuitry transmits the characterizing signal to the wireless power transmitter responsive to a request received from the wireless power transmitter.

17. The wireless power receiver of claim 16 wherein the request received from the wireless power transmitter is a frequency shift keyed signal.

18. The wireless power receiver of claim 13 wherein the characterizing signal is a step signal.

19. A wireless power transfer system comprising a wireless power transmitter and a wireless power receiver:

wherein the wireless power transmitter further comprises:

an inverter that receives a DC input voltage and produces an AC output voltage;

a wireless power transmitter coil that receives the AC output voltage from the inverter and delivers power to a wireless power receiver by magnetic coupling;

controller and communications circuitry that controls the inverter and provides in-band communications with the wireless power receiver via the wireless power transmitter coil, wherein the controller and communications circuitry that:

receives the results of a characterizing signal transmitted by the wireless power receiver;

computes at least two parameters of a model characterizing an in-band communications channel based on the received results of the characterizing signal transmitted by the wireless power receiver, wherein a first parameter corresponds to a time constant of the channel, and a second parameter corresponds to a damping value of the communications channel;

computes a plurality of equalizing filter taps from the at least two parameters; and applies the computed equalizing filter taps to subsequent signals received by the wireless power transmitter via the in-band communications channel;

and wherein the wireless power receiver further comprises:

a wireless power receiver coil that receives power from a wireless power transmitter by magnetic coupling;

a rectifier that receives an AC voltage from the wireless power receiver coil and produces a DC output voltage to power a load;

controller and communications circuitry that controls the rectifier and provides in-band communications with the wireless power transmitter via the wireless power receiver coil, wherein the controller and communications circuitry transmit a characterizing signal to the wireless power transmitter.

20. A method performed by one or more processing elements of a wireless power transfer system, the method comprising:

using a wireless power receiver to transmit a characterizing signal to the wireless power receiver via a communication channel in-band with the wireless power transfer;

using a wireless power transmitter to:

receive the results of a characterizing signal transmitted by the wireless power receiver;

compute at least two parameters of a model characterizing an in-band communications channel based on the received results of the characterizing signal transmitted by the wireless power receiver, wherein a first parameter corresponds to a time constant of the channel, and a second parameter corresponds to a damping value of the communications channel;

compute a plurality of equalizing filter taps from the at least two parameters; and apply the computed equalizing filter to subsequent signals received by the wireless power transmitter via the in-band communications channel.

* * * * *